Dec. 7, 1965  G. H. DENNIS  3,222,663
GROUND FAULT DETECTING DEVICE
Filed Oct. 30, 1961
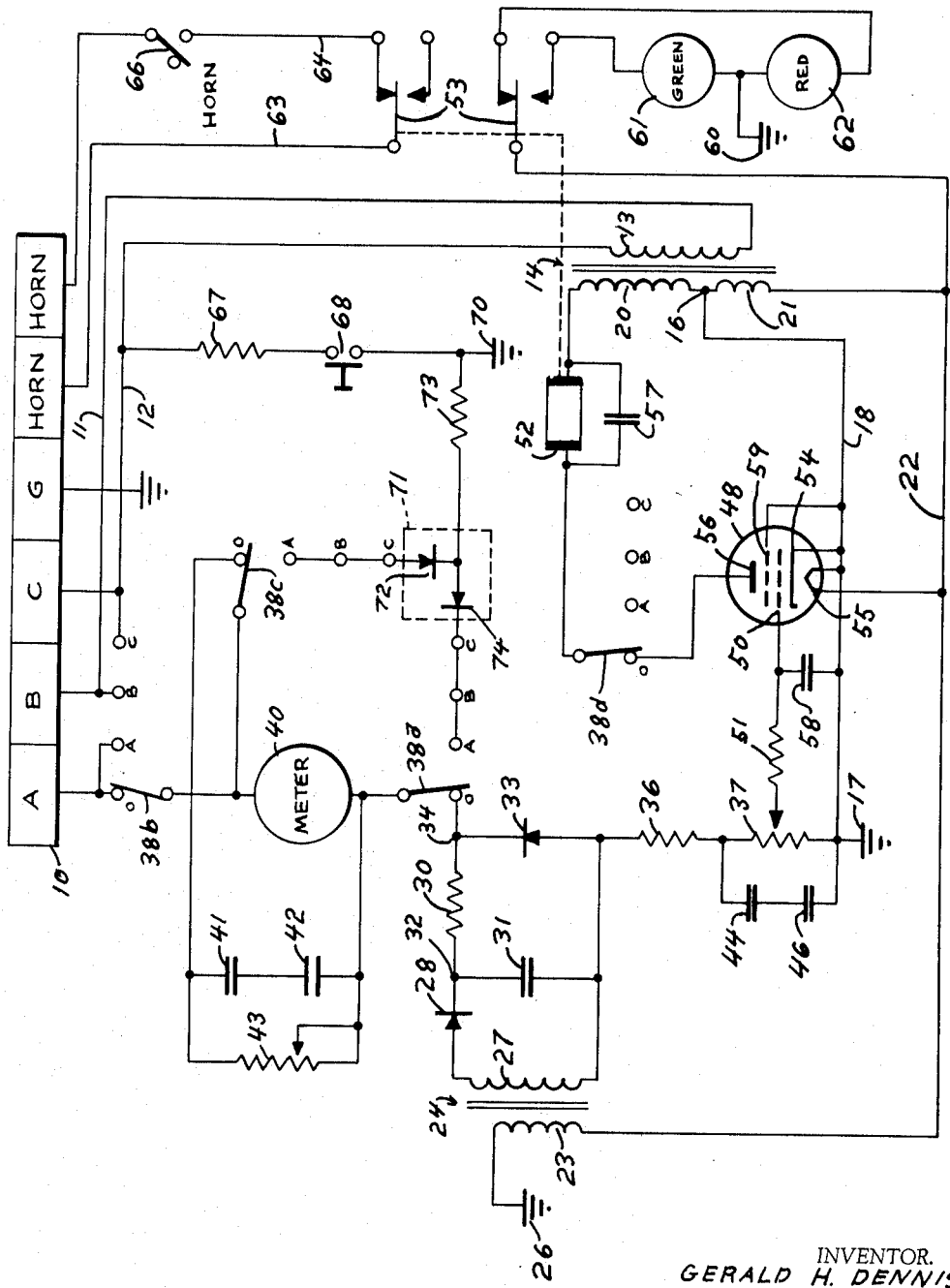
INVENTOR.
GERALD H. DENNIS
BY Barnes & Seed
ATTORNEYS

United States Patent Office 3,222,663
Patented Dec. 7, 1965

3,222,663
GROUND FAULT DETECTING DEVICE
Gerald H. Dennis, 1706 Esplanade, Redondo Beach, Calif.
Filed Oct. 30, 1961, Ser. No. 148,671
4 Claims. (Cl. 340—255)

This invention relates generally to a device and method for detecting ground faults in an electrical system and more particularly to a device and method for detecting such faults in an ungrounded single-phase or multi-phase electrical system.

In an ungrounded system, the overall resistance between the electrical conductors and ground is desirably in the neighborhood of several megohms. If a serious breakdown of the system-to-ground resistance does occur, there is danger to personnel, and considerable damage could be done to equipment. Although such large ground faults can arise rather quickly as a result of some abrupt disturbance, generally their development is a much slower process, resulting from chafing or other gradual deterioration of the insulation. In the initial stages of such deterioration, the ground resistance will drop to perhaps several hundred thousand ohms, a change which is hardly noticeable in the operation of the system, since it is a level of resistance which is still very high with respect to the internal resistance of the system itself. It is not until the breakdown of the system-to-ground insulation has advanced to what might be a real danger point that there is any noticeable effect on the actual functioning of the system.

One prior art method of ascertaining the presence of ground faults, to be used, for example, in a three-phase system, is to connect a lamp between each phase terminal and ground. If a fault were to appear in any one phase, which fault were sufficient to produce a decrease in voltage from the related terminal to ground, the voltage drop across the related lamp would decrease. By comparing the voltages across the three lamps, and making an alarm system sensitive to variations in voltage drop across each lamp relative to the others, ground faults can be detected.

However, a major drawback of this method is that such a voltage drop in a phase will not occur until the ground fault has become considerably advanced and has perhaps reached an actual danger point. Another consideration is that if the several phases each experience a breakdown of ground resistance, each of which is of about the same magnitude as that of the other phases, the voltage across the lamps will drop proportionately, and the alarm system will not register the faults. Further, if one phase is loaded more heavily than another, there might be a disproportionate voltage drop across one lamp so as to actuate the alarm, even though no ground fault exists. Beyond this, there is a certain amount of danger to personnel in deliberately grounding the phases through lamps, since there is more likelihood of completing a circuit from one phase, thence through a person to ground and back to another phase through one of such lamps.

Another prior art method of detecting ground faults is to shut down the system and impose a known D.C. voltage thereon. By grounding a terminal of the D.C. voltage source, if a ground fault does exist, a current will be caused to flow from one terminal through the system to the ground fault and thence through ground to the D.C. voltage source. By measuring the current, the ground resistance of the system can be ascertained.

This method, however, requires a shutdown of the system, and therefore cannot be a constant monitor. Also it measures the ground resistance only at that time of shutdown. If the system, while operating, is subject to some vibrations or temperature variations which might lower the ground resistance only during operation, such modified level of ground resistance will not be indicated by this method.

It is in view of these aforementioned considerations that the method and apparatus of the present invention were conceived, a general object of this invention being to provide a reliable means of detecting ground faults of relatively small magnitude without requiring a shutdown of the system in which said ground faults might exist.

Ancillary to the above object is that of providing means to constantly monitor a single-phase or multi-phase system in a manner to immediately detect ground faults in their initial stages of development, before there is any real danger to either personnel or equipment.

It is a further object to provide a means to detect such faults regardless of the magnitude of, or any unbalance of, the load on the system.

It is yet another object to reliably detect such ground faults regardless of their location in the system.

Another object is to provide convenient means to check the reliability of the testing apparatus, and to so utilize the testing apparatus that certain defects in the apparatus itself will not conceal any ground faults in the system.

Yet another object is to so arrange the testing apparatus that the terminal to ground voltage of the phases of the system can be conveniently ascertained.

Other more particular objects and advantages will, together with these general objects, appear and be understood in the course of the following description and claims, the invention consisting in the novel construction and process and in the adaptation and combination of parts hereinafter described and claimed.

The figure is a schematic drawing illustrating a circuit embodying preferred teachings of my invention.

It is believed that a more thorough understanding of the operation and novel features of this invention will be obtained by first indicating rather generally the overall nature and operation thereof, after which will follow a more detailed explanation.

The internal resistance of an A.C. system to D.C. current is extremely low. By connecting a D.C. power source in series with a meter from ground to the system to be monitored, a D.C. current will be caused to flow through the system and through the insulation resistance to ground. An A.C. voltage will also be present between the system and ground, causing an A.C. current to flow in the same circuit as does the aforementioned D.C. current. Since the D.C. current is proportional to the insulation resistance (in parallel with faults which might exist), it is only necessary to separate the A.C. current from the D.C. current and measure the D.C. current to determine the ground resistance of the system under test. The D.C. power source must maintain a constant voltage for the analysis to be valid.

Referring to the accompanying drawing, numeral 10 designates a board of suitable insulating material, on which are mounted six terminals. The terminal points designated A, B and C lead each to a related one of three terminals of some three-phase electrical system to be tested. The terminal point G is connected to the instrument case (not shown) and leads to some suitable external ground such as a nearby metal conduit, while the two terminals marked "Horn" lead to an external signaling device (not shown) such as a horn or a bell.

Power is taken from the system to be tested through two leads 11 and 12, connecting, respectively, the terminals B and C to opposite ends of the primary winding 13 of the transformer 14. The secondary winding has a middle point 16 grounded at 17 through lead 18, which thus forms upper and lower secondary windings 20 and 21, respectively.

The lower winding 21 delivers current through lead 22 to the primary winding 23 of a transformer 24 and thence back to ground at 26. This transformer 24, a rectifier 28, a resistance 30, and a capacitor 31 comprise the D.C. power source. The upper end of the secondary winding 27 is connected to the rectifier 28 and then in series to the resistor 30. The lower end of the secondary winding leads to the lower side of the capacitor 31, while the upper side of this capacitor leads to a juncture point 32 between the rectifier 28 and the resistor 30.

The rectifier 28 functions to allow pulses of current from the transformer 24 to pass to the resistance 30, while the capacitance 31 supplies current between such pulses so as to maintain a steady flow of current to the resistor. A Zener regulator 33 leads from the lower end of the secondary winding 27 to a juncture point 34 which connects to the resistance 30 on the opposite side as does the juncture point 32. It is characteristic of the Zener regulator to maintain a constant D.C. voltage over wide load variations, thus insuring that the voltage at point 34 is maintained at a substantially constant level.

The lower end of the Zener regulator is connected in series with the two resistors 36 and 37 to ground at 17. These resistors serve not only to limit the current to the juncture point 34, but also function to activate an alarm system to be described hereinafter. A switch 38a, connects the juncture point 34 to the lower side of a meter 40, when said switch is in its O position, while a switch 38b, in O position, leads from the upper side of the meter 40 to terminal A. A third switch 38c, in its O position, connects two capacitors 41 and 42, arranged back to back, in parallel with the meter. Substantially all the A.C. by-passes the meter 40 through the capacitors 41 and 42 so that the meter will read only D.C. current. A variable resistor 43 is also connected in parallel with the meter 40 so that by varying the value of this resistor the meter can be properly adjusted so as to compensate for differences in regulation voltages of various Zener diodes.

Since the resistance of the entire three phase system to D.C. is very low in comparison with the level of ground resistance to be measured, for all practical purposes, it can be considered to be zero. This, along with the fact that the system is ungrounded, causes all three phases in the entire system to be maintained at a D.C. voltage which is impressed at any point on any one phase. Thus the entire system, connecting through the meter 40 to the juncture point 34, will be at substantially the same potential as is this point 34. When any point in the system experiences a slight breakdown in ground resistance, some current will flow from the ground at 17 through the resistors 37 and 36, thence through the meter 40 into the system to the fault and back to ground. Thus the meter, by sensing the amount of current therethrough, will disclose the magnitude of the ground fault, the meter being calibrated to indicate resistance.

Referring now to the resistor 37, two capacitors 44 and 46, arranged back to back, are connected in parallel with the resistor so as to cause any A.C. current to by-pass this resistor. The result is that there will be a voltage drop across this resistor only when D.C. current is flowing from the ground point 17 through the meter 40 and through the three-phase system in the aforedescribed manner. The voltage drop across the resistor 37 is utilized to control a thyratron 48 by connecting the control grid 50 thereof (through a resistor 51 to prevent grid current from the thyratron) to a selected point on the resistor 37. Thus when current flows through the resistor 37, the resulting voltage drop drives the grid 50 negative, causing the relay 52 to "drop out," which moves a double switch 53 to activate an appropriate alarm system.

To describe this latter circuit portion more particularly, the cathode 54 and one grid 59 of the thyratron are connected to ground at 17 through the lead 18. Current is drawn from the transformer winding 21 through the lead 22 to heat the filament 55 and returns to winding 21 through lead 18. The anode 56 is connected in series with the switch 38d (closed in O position) and the relay 52 to the ungrounded end of the secondary winding 20. In parallel with the relay 52 is a capacitor 57, which maintains a steady flow of current through the relay to prevent any chatter thereof. Connected between the grid 50 and the grounded line 18 is a capacitor 58 which serves to prevent oscillation.

When there is no D.C. current through the meter 40, and hence no voltage drop across the resistance 37, the grid 50 is at ground potential so as to allow the thyratron 48 to conduct. Current flows from the grounded line 18 through the thyratron and relay 52, and thence back through the secondary winding 20 to ground. When the thyratron 48 is so conducting, the relay 52 holds the switch 53 in down position, so that current flows from ground at 60 through the green light 61 to the winding 21 and back to the grounded line 18.

When D.C. current does flow through the meter 40, the grid 50 is driven negative to stop the thyratron from conducting, and cause the relay 52 to drop out. This in turn causes the switch 53 to go to the upper position as indicated in FIG. 1, so that current will flow from ground at 60, through the red light 62 and thence through the winding 21 back to ground. Also, this switch 53 in this upper position connects the Horn terminals by joining the leads 63 and 64, thus to activate the external alarm system (e.g. a horn or a bell, etc.) mentioned hereinbefore. A manual switch 66 can be used to break this alarm circuit.

It should be noted that if the thyratron should fail to conduct, the relay 52 will automatically drop out to turn the green light off and the red light on. This prevents the posibility of failing to detect a ground fault because of tube failure, since the alarm circuit will remain open and the green light will stay on only when the thyratron is conducting properly.

So that the apparatus may be periodically checked, a test fault is added to the system by connecting a known resistance 67 in series with a button switch 68 to ground at 70. By closing the switch 68 a known ground fault (i.e. the resistor 67) is imposed on the system, and it can be determined if the apparatus reacts properly.

In actual practice the four aforementioned switches 38a, b, c and d, are all operated by one knob (not shown). Each switch has four positions, designated O, A, B, and C, and all four switches are so arranged relative to the knob, that in any one knob location all the switches are in the same corresponding position, i.e. either all in A position, or B position, etc.

As previously indicated, the O position of all four is so arranged that the apparatus can perform its main function of monitoring the system for ground faults. The A, B, and C positions serve to test the phase to ground voltage of respectively, A, B and C phases. The switch 38d, in its A, B and C positions breaks the circuit through the relay 52 so as to turn on the red light 62 and activate the alarm connected to the horn terminals. The switch 38c, in A, B and C positions, functions to disconnect the upper side of the meter 40 from the capacitors 41 and 42 and the resistor 43, and to connect the upper side of the meter to one side of a meter rectifier 71. The lower side of the meter 40 is disconnected from the juncture point 34 by placing the switch 38a in A, B or C position, which positions connect the lower side of the meter 42 to the meter rectifier 71. The switch 38b, in its A, B or C position connects the upper side of the meter 42 to, respectively, either the A, B or C terminal of system to be monitored.

Assuming now that the four switches 38a, b, c and d are all in A position on one half-cycle, voltage is impressed from terminal A through the switch 38c, through rectifier 72, and the resistor 73 to ground at 70. On the other half-cycle voltage is impressed from ground at 70, through the rectifier 74, the switch 38a, and the meter 40, to the terminal A. Thus the meter will read the voltage from terminal A to ground and in either B or C position will read the terminal to ground voltage of, respectively, terminals B or C.

In operation, the three terminals A, B and C are connected to the three phases of the system to be monitored, the G terminal is connected to an external ground, and the Horn terminals are connected to some external alarm. Then a copper wire is connected from any one of the three phases to ground to act as a ground fault of substantially zero resistance. By adjusting the resistor 43, the meter is brought to read zero ohms.

The resistor 37 is then set by connecting a known resistance from the system to ground, and then adjusting the contact point to the resistor until the thyratron 48 will just conduct. When the system to ground resistance falls below this level, the thyratron will not conduct and in the aforedescribed manner will turn off the green light 61, turn on the red light 62 and activate the external alarm connected to the horn terminals. Whenever it is desired to check whether the apparatus is properly functioning, it is necessary only to close the button switch 68 to impose the test fault resistor 67 on the system, and then to observe whether the meter 40, the red light 62, and the external alarm operate as desired.

It should be noted that if the switches 38a, b, c and d are in other than O position, the circuit portion through relay 52 will be broken to turn on the red light 62. This is to give warning that the apparatus is not monitoring the system for ground faults.

It is belived that the invention will have been clearly understood from the foregoing description of my now-preferred illustrated embodiment. No limitations are to be implied, the invention being that the hereto annexed claims be given the broadest interpretation to which the empolyed language fairly admits.

What I claim is:

1. A device to detect a ground fault in a multi-phase ungrounded system having at least three phases, comprising:
   (a) power supply means for said device connected across two phases to provide A.C. current from said system,
   (b) means connected to said power supply means providing a D.C. voltage source and including voltage regulating means to provide a constant level D.C. supply for said system,
   (c) said D.C. supply being grounded through a resistance element connected in series with said D.C. voltage source,
   (d) means connected in parallel with said resistance element to by-pass A.C. current,
   (e) means to measure D.C. current flowing in said system from said D.C. voltage source,
   (f) means connected in parallel with said measuring means to by-pass A. C. current.
   (g) means connected to said resistance element for sensing a change in D.C. voltage drop thereacross,
   (h) a normally open alarm circuit,
   (i) and relay means connected to said alarm circuit and said sensing means and responsive to said sensing means to close said alarm circuit upon a change in voltage drop across said resistance element,
   (j) switch means for selectively disconnecting said D.C. voltage source from said system and connecting said measuring means between a selected one of said phases and ground,
   (k) and other switch means connected to said first named switch means for closing said alarm circuit when said measuring means is indicating ground to phase voltage, thus insuring that the device is not at that time functioning to indicate ground to system resistance.

2. A device to detect a ground fault in multi-phase ungrounded systems having at least three phases, comprising:
   (a) means to produce a constant level D.C. voltage source for said system including power supply means for said device connected across two phases to provide A.C. current from said system, means connected to said power supply means providing a D.C. voltage source, and voltage regulating means to provide a constant level D.C. supply for said system,
   (b) means to measure D.C. current flowing in said system from said D.C. voltage source,
   (c) said D.C. supply being grounded through a resistance element connected in series with said D.C. voltage source,
   (d) means connected in parallel with said resistance element to by-pass A.C. current,
   (e) means connected to said resistance element for sensing a change in D.C. voltage drop thereacross,
   (f) a normally open alarm circuit,
   (g) relay means connected to said alarm circuit and said sensing means and responsive to said sensing means to close said alarm circuit upon a change in voltage drop across said resistance element,
   (h) switch means for selectively disconnecting said D.C. voltage source from said system and connecting said measuring means between a selected one of said phases and ground,
   (i) and other switch means connected to said first named switch means for closing said alarm circuit when said measuring means is indicating ground to phase voltage, thus insuring that the device is not at that time functioning to indicate ground to system resistance.

3. A device to detect a ground fault in multi-phase ungrounded systems having at least three phases, comprising:
   (a) means to produce a constant level D.C. voltage source for said system including power supply means for said device connected across two phases to provide A.C. current from said system, means connected to said power supply means providing a D.C. voltage source, and voltage regulating means to provide a constant level D.C. supply for said system,
   (b) means to measure D.C. current flowing in said system from said D.C. voltage source,
   (c) said D.C. supply being grounded through a resistance element connected in series with said D.C. voltage source,
   (d) means connected in parallel with said resistance element to by-pass A.C. current,
   (e) means connected to said resistance element for sensing a change in D.C. voltage drop thereacross,
   (f) a normally open alarm circuit,
   (g) relay means connected to said alarm circuit and said sensing means and responsive to said sensing means to close said alarm circuit upon a change in voltage drop across said resistance element,
   (h) switch means for selectively disconnecting said D.C. voltage source from said system and connecting said measuring means between a selected one of said phases and ground,
   (i) and compound switch means for selectively connecting said measuring means between a related one of said phases and ground and closing said alarm circuit whereby the voltage drop from said selected phase to ground is indicated by said measuring means and said alarm circuit functions to indicate that the device is not indicating ground to system resistance.

4. A device to detect a ground fault in a multi-phase ungrounded system having at least three phases, comprising:
   (a) a transformer to take power from said system from two of said phases,
   (b) a D.C. power source comprising a rectifier which receives power from said transformer, said D.C. power source impressing a voltage between ground and said system,
   (c) a resistance means connected in series between said D.C. power source and ground so as to limit the current resulting therefrom, (d) a meter to read D.C. current flowing in said system from said D.C. power source, (e) capacitance means in parallel with said meter to cause A.C. current to by-pass said meter, thus allowing said meter to read only D.C. current flowing from said D.C. voltage source through said system, to ground, and back to said D.C. voltage source, to thus ascertain the resistance between the system and ground, (f) a tube having a voltage impressed thereacross, (g) capacitance means in parallel with said resistance means to cause A.C. current to by-pass said resistance means, (h) a grid to control the current through said tube, said grid being operatively connected to said resistance so that as current through said resistance means is modified, a change in voltage drop across said tube results, said change in said voltage drop acting to change the conductivity of said tube, (i) an alarm circuit connected to said tube in a manner that a change in the conductivity of said tube serves to modify current in said circuit so as to activate said alarm, thus enabling a change in the resistance between said system and ground to modify the conductivity of said tube so as to activate said alarm, (j) switch means to connect one side of said meter to a selected one of said phases and to connect the other side of said meter to ground thus allowing said meter to indicate the voltage drop from said selected phase to ground, and (k) other switch means connected to said first named switch means in a manner that when said meter is indicating ground to phase voltage said other switch means is moved to a position to close the alarm circuit to activate said alarm, thus insuring that said alarm will indicate that the device is not at that time functioning to indicate ground to system resistance.

References Cited by the Examiner

UNITED STATES PATENTS

| | | | |
|---|---|---|---|
| 467,317 | 6/1892 | Rudd | 324—52 |
| 2,027,209 | 1/1936 | Starr | 317—18 |
| 2,390,788 | 12/1945 | Harder | 340—213 |
| 2,473,940 | 6/1949 | Clark | 340—214 |
| 2,488,420 | 11/1949 | Ludwig | 324—123 |
| 2,721,307 | 10/1955 | Bowles | 340—255 XR |
| 2,999,189 | 9/1961 | Gerrard | 340—255 XR |
| 3,056,082 | 9/1962 | Redding | 324—54 XR |
| 3,058,035 | 10/1962 | Brown | 317—18 |

FOREIGN PATENTS 505,357   9/1951   Belgium.

NEIL C. READ, *Primary Examiner.*